United States Patent
Allen et al.

(10) Patent No.: US 10,503,768 B2
(45) Date of Patent: *Dec. 10, 2019

(54) ANALOGIC PATTERN DETERMINATION

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 295 days.

This patent is subject to a terminal disclaimer.

(21) Appl. No.: 15/287,154

(22) Filed: Oct. 6, 2016

(65) Prior Publication Data

US 2018/0101603 A1 Apr. 12, 2018

(51) Int. Cl.
*G06F 16/33* (2019.01)
*G06N 5/02* (2006.01)
*G06F 17/27* (2006.01)
*G06N 20/00* (2019.01)

(52) U.S. Cl.
CPC ...... *G06F 16/3344* (2019.01); *G06F 17/2785* (2013.01); *G06N 5/022* (2013.01); *G06N 20/00* (2019.01)

(58) Field of Classification Search
CPC .................................................. G06F 17/2785
USPC ............................................................. 704/9
See application file for complete search history.

(56) References Cited

U.S. PATENT DOCUMENTS

| | | | |
|---|---|---|---|
| 5,276,774 A | 1/1994 | Orihara et al. | |
| 6,523,026 B1 | 2/2003 | Gillis | |
| 6,816,857 B1* | 11/2004 | Weissman | G06F 17/30684 |
| 7,403,938 B2 | 7/2008 | Harrison et al. | |
| 7,630,981 B2 | 12/2009 | Xu et al. | |
| 8,190,422 B2 | 5/2012 | Ascoli et al. | |
| 8,938,463 B1 | 1/2015 | Kim et al. | |
| 2009/0089047 A1 | 4/2009 | Pell et al. | |

(Continued)

OTHER PUBLICATIONS

Turney, Peter D. "Distributional semantics beyond words: Supervised learning of analogy and paraphrase." arXiv preprint arXiv: 1310.5042; (2013). (Year: 2013).*

(Continued)

*Primary Examiner* — William Spieler
(74) *Attorney, Agent, or Firm* — Lieberman & Brandsdorfer, LLC

(57) ABSTRACT

Embodiments relate to a system, program product, and method for use with an intelligent computer platform to decipher analogical phrases. An analogy list is obtained, each analogy within the analogy list having a known meaning, and receiving an analogy phrase. A verb is identified within the phrase and a verb definition list is generated. A subject is identified within the phrase and a subject definition list is generated. An adjective is identified within the phrase and an adjective definition list is generated, including filtering adjectives to accept adjective definitions associated with the identified subject. A set of outcomes is identified, incorporating the verb definition, subject definition, and adjective definition, and a corpus is searched for evidentiary use. The outcomes are ranked in accordance to evidentiary use found in the corpus the highest ranked outcome is outputted.

9 Claims, 16 Drawing Sheets

(56) References Cited

U.S. PATENT DOCUMENTS

2015/0066476 A1  3/2015  Midmore et al.
2015/0310002 A1* 10/2015  Yu .......................... G06F 17/241
                                                            707/750
2017/0200081 A1*  7/2017  Allen ....................... G06N 5/02

OTHER PUBLICATIONS

Shutova, Ekaterina. "Models of metaphor in NLP." Proceedings of the 48th annual meeting of the association for computational linguistics. Association for Computational Linguistics, 2010. (Year: 2010).*

Langlais, Philippe. "Issues in Analogical Learning over Sequences of Symbols: a Case Study with Named Entity Transliteration." Similarity and Analogy-based Methods in AI SAMAI 2012: 49. (Year: 2012).*

Shutova, Ekaterina, Simone Teufel, and Anna Korhonen. "Statistical metaphor processing." Computational Linguistics 39.2 (2013): 301-353. (Year: 2013).*

List of IBM Patents or Applications Treated as Related, Oct. 2016.

* cited by examiner

ANALOGIC PATTERN DETERMINATION

BACKGROUND

The present invention relates to natural language processing. More specifically, the invention relates to recognizing and resolving the meaning of an analogical pattern.

In the field of artificially intelligent computer systems, natural language systems (such as the IBM Watson™ artificially intelligent computer system or and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

For example, analogies are language constructs which enable people to transfer knowledge from one situation or context (the source) to another (the target) based on a conceptual similarity there between, and provide powerful cognitive mechanisms or tools that can be used to explain something that is unknown in terms of a related concept that is known to someone. At the core of analogical reasoning lies the concept of similarity, but the process of understanding an analogy requires reasoning from a relational perspective that can be challenging, especially across languages since the word-for-word translation may not capture the essence of the original statement. In addition, automated systems and other natural language systems which come across an analogy in a question or answer corpus will also have a difficult time with identifying and understanding analogies. As a result, existing solutions for efficiently identifying and understanding analogies for training and/or use by a natural language processing system are extremely difficult at a practical level.

SUMMARY

The embodiments include a system, computer program product, and method for deciphering a phrase presented in an analogical pattern format.

In one aspect, a system is provided for use with an intelligent computer platform for deciphering an analogical phrase. A processing unit is operatively coupled to memory and is in communication with an artificial intelligence platform. A tool, in communication with the processing unit, is activated by the artificial intelligence platform and employed to decipher a phrase. More specifically, deciphering the phrase includes obtaining an analogy list, whereby each analogy within the analogy list has a known meaning, and receiving an analogy phrase. The tool identifies at least one verb within the analogy phrase and generates a verb definition list for the identified verb. The tool identifies a subject within the analogy phrase and generates a subject definition list for the identified subject, whereby the subject list has a relative term of the subject. The tool also identifies an adjective within the analogy phrase and generates an adjective definition list for the identified adjective, including filtering adjectives to accept adjective definitions associated with the identified subject and discarding non-associated definitions. A set of outcomes are identified, each outcome set including a verb definition, a subject definition, and an adjective definition. For each outcome in the identified set of outcomes, the tool searches a corpus for evidentiary use. The set of outcomes are then ranked in accordance to an amount of evidentiary use found in the corpus and the outcome with the highest ranking is outputted.

In another aspect, a computer program device is provided for use with an intelligent computer platform for deciphering an analogical phrase. The device has program code embodied therewith. The program code is executable by a processing unit to obtain an analogy list, whereby each analogy within the analogy list has a known meaning, and receive an analogy phrase. The processing unit identifies at least one verb within the analogy phrase and generates a verb definition list for the identified verb. The processing unit identifies a subject within the analogy phrase and generates a subject definition list for the identified subject, whereby the subject list has a relative term of the subject. The processing unit also identifies an adjective within the analogy phrase and generates an adjective definition list for the identified adjective, including filtering adjectives to accept adjective definitions associated with the identified subject and discarding non-associated definitions. A set of outcomes are identified, each outcome set including a verb definition, a subject definition, and an adjective definition. For each outcome in the identified set of outcomes, the processing unit is to search a corpus for evidentiary use. The set of outcomes are then ranked in accordance to an amount of evidentiary use found in the corpus and the outcome with the highest ranking is outputted.

In yet another aspect, a method is provided for use by an intelligent computer platform for deciphering an analogical phrase. The method obtains an analogy list, each analogy within the analogy list having a known meaning, and receives an analogy phrase. At least one verb is identified within the analogy phrase and a verb definition list is generated for the identified verb. A subject is identified within the analogy phrase and a subject definition list is generated for the identified subject, whereby the subject list has a relative term of the subject. An adjective is identified within the analogy phrase and an adjective definition list is generated for the identified adjective, including filtering adjectives to accept adjective definitions associated with the identified subject and discarding non-associated definitions. A set of outcomes is identified, each outcome set including a verb definition, a subject definition, and an adjective definition, and for each outcome in the identified set of outcomes, a corpus is searched for evidentiary use. The set of outcomes is ranked in accordance to an amount of evidentiary use found in the corpus and the outcome with the highest ranking is outputted.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
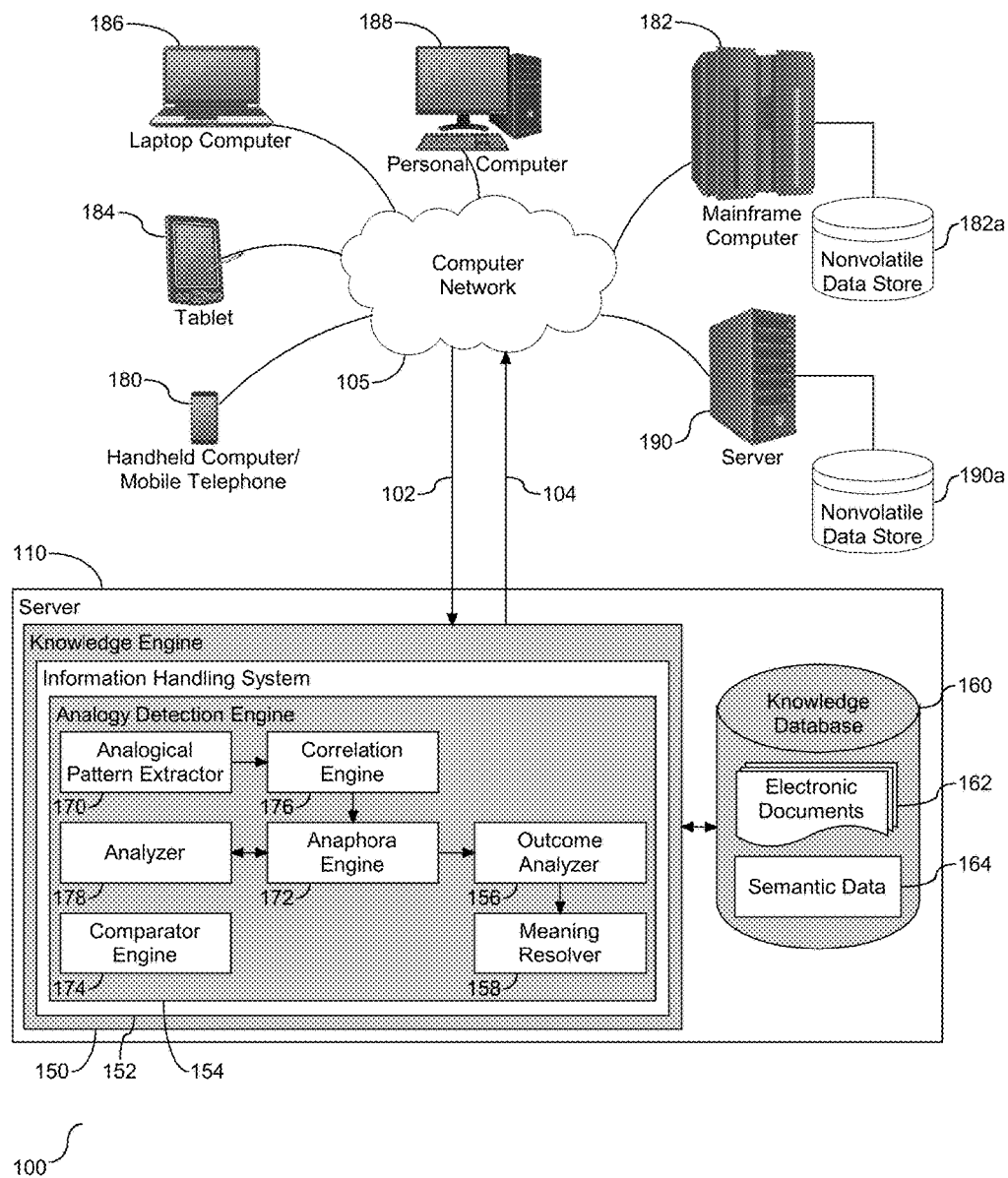
FIG. 1 depicts a system diagram illustrating a content and response system connected in a network environment that uses an analogy detection engine to identify and analyze analogies.

Referring to FIG. 1, a schematic diagram of a natural language process system (100) is depicted. As shown, a server (110) is provided in communication with a plurality of computing devices (180), (182), (184), (186), and (188) across a network connection (105). The server (110) is configured with a processing unit in communication with memory across a bus. The server (110) is shown with a knowledge engine (150) for natural language processing over the network (105) from one or more computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) may enable analogical pattern recognition and resolution for one or more content users. Other embodiments of the server (110) may be used with components, systems, sub-systems, and/or devices other than those that are depicted herein.

The knowledge engine (150) may be configured to receive input from various sources. For example, knowledge engine (150) may receive input from the network (105), one or more knowledge bases of corpus (160) of electronic documents (162), semantic data (164), or other data, content users, and other possible sources of input. In selected embodiments, the knowledge base (160), also referred to herein as corpus, may include structured, semi-structured, and/or unstructured content in a plurality of documents that are contained in one or more large knowledge databases or corpus. The various computing devices (180), (182), (184), (186), and (188) in communication with the network (105) may include access points for content creators and content users. Some of the computing devices may include devices for a database storing the corpus of data as the body of information used by the knowledge engine (150) to generate an analogical pattern outcome (104). The network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from or represented in documents, network accessible sources and/or structured data sources. In this manner, some processes populate the knowledge engine (150) with the knowledge engine (150) also including input interfaces to receive requests and respond accordingly.

As shown, content may be in the form of one or more electronic documents or files (162) for use as part of the corpus (160) of data with the knowledge engine (150). The corpus (160) may include any structured and unstructured documents, including but not limited to any file, text, article, or source of data (e.g. scholarly articles, dictionary, definitions, encyclopedia references, and the like) for use by the knowledge engine (150). Content users may access the knowledge engine (150) via a network connection or an internet connection to the network (105), and may submit natural language input to the knowledge engine (150) that may effectively determine a meaning of an analogy present in the submissions by searching content in the corpus of data. As further described below, when a process evaluates a given section of a document for semantic content, the process can use a variety of conventions to query it from the knowledge engine (150). Semantic content is content based on the relation between signifiers, such as words, phrases, signs, and symbols, and what they stand for, their denotations, or connotations. In other words, semantic content is content that interprets an expression, such as by using Natural Language (NL) processing. In one embodiment, the process sends well formed content (102), e.g. natural language text, to the knowledge engine (150), so that the content (102) may be interpreted and the knowledge engine (150) may provide a response in the form of one or more outcomes (104). In one embodiment, the knowledge engine (150) may provide a response in the form of a ranked list of outcomes (104).

In some illustrative embodiments, server (110) may be the IBM Watson™ system available from International Business Machines Corporation of Armonk, N.Y., which is augmented with the mechanisms of the illustrative embodiments described hereafter. The IBM Watson™ knowledge manager system may receive input content (102) which it then parses to extract the major features of the content (102) that in turn are then applied to the corpus of data stored in the knowledge base (160). Based on application of the content (102) to the corpus of data, a set of candidate outcomes are generated by looking across the corpus of data for portions of the corpus of data that have some potential for containing a matching analogical pattern to the submitted content (102).

In particular, received content (102) may be processed by the IBM Watson™ server (110) which performs analysis on the language of the input content (102) and the language used in each of the portions of the corpus of data found during application of the content using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input content (102) and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response (104) is inferred by the input content (102) based on the specific area of focus of that reasoning algorithm. Each resulting score is weighted against a statistical model. The statistical model captures how well the reasoning algorithm performed at establishing the inference between two similar passages for a particular domain during the training period of the IBM Watson™ system. The statistical model may be used to summarize a level of confidence that the IBM Watson™ system has regarding the evidence that the potential response (104), i.e., candidate analogy, is inferred by the submitted content (102) question. This process may be repeated for each of the candidate outcomes (104) until the IBM Watson™ system (110) identifies candidate outcomes that surface as being significantly stronger than others and thus, generates a final analogy outcome (104), or ranked set of outcomes, for the input content (102).

To process natural language, the system (110) may include an information handling system (152) which uses an analogy detection engine (154) to identify and analyze analogies by detecting and categorizing analogical patterns, generating potential meanings for each detected analogical pattern from characteristic metadata for terms in the analogical pattern, and identifying a best meaning for the detected analogical pattern by analyzing and scoring the potential meanings based on the characteristic metadata and terms in the detected analogical pattern. Though shown as being embodied in or integrated with the server (110), the information handling system (152) and/or analogy detection engine (154) may be implemented in a separate computing system (e.g., 190) that is connected across network (105) to the server (110). Wherever embodied, the analogy detection engine (154) detects and categorizes analogical patterns, generates potential meanings for each detected analogical pattern, and identifies a best meaning for the detected analogical pattern by analyzing and scoring the potential meanings based on the characteristic metadata and terms in the detected analogical pattern.

In selected example embodiments, the analogy detection engine (154) may include an analogical pattern extractor (170) that is configured to apply NL processing to detect an analogy in a source text segment by mapping parsed terms and phrases from the sentence into one or more potential analogical patterns. As described in more detail with reference to FIGS. 3 and 4, the analogical pattern extractor (170) may perform a sentence structure analysis to parse sentences and denote terms identifying one or more analogical patterns having a source analogic (e.g., source term type and analogical phrase) connected by a comparator to a target analogic (e.g., target analogical phrase and characteristic term). For example, the information handling system may use a Slot Grammar Logic (SGL) parser to perform parse of a source sentence to detect one or more specified analogical patterns (e.g., "[noun] [verb] like [x] as a [y]" or variations thereof, such as "[noun] [verb phrase] [comparator] [adjective] [noun phrase]"). The analogical pattern extractor (170) may also be configured to apply one or more learning methods to match a detected analogical pattern to known patterns to decide and categorize the source sentence as an analogy.

As shown, the analogy detection engine (154) employs three sub-engines to support resolution of the analogical pattern, including an anaphora engine (172), a comparator engine (174), and a correlation engine (176). The anaphora engine (172) functions to resolve the anaphora, and in one embodiment resolve the relationship of the anaphora to the noun, as identified by the analogy detection engine (170). The comparator engine (174) functions to resolve the comparator, and more specifically to identify how the comparator is being employed in the context of the parsed sentence. The correlation engine (176) functions to identify the relationship or connection of keywords in the parsed sentence, and to apply analytic analysis to refine specific terms in the detected analogical pattern for entity resolution, ontology, and other term characteristics or metadata (e.g., by using the definition of the terms and ontology) for use in determining the outcome or meaning of the analogy. A definition of a term or phrase, as used herein, is an explanation of the meaning of the term or phrase.

The analysis performed by the correlation engine (176) may use the right or left analogic to search the corpus or knowledge database (160) for matching references to provide evidence for possible meaning to the analogy. The retrieved evidence references may then be processed to normalize the reference type or attribute (e.g., for the noun or object or verb term). To support the normalization process, the correlation engine (176) may also use the words in the definition or meaning of the term in addition to major characteristics associated with the term to assist the pattern correlator in assignment and resolving a term. As a result of processing the retrieved evidence references, potential meanings for each detected analogical pattern are generated from the analogical pattern terms and associated characteristic metadata.

To evaluate which of the potential meanings best corresponds to the detected analogical pattern, the analogy detection engine (154) may be configured to use the definitions of the terms and ontology in the analogical pattern to determine and score potential meanings of the analogy based on the options from the term characteristic alignments and their agreements when combined. For example, the analogy detection engine (154) may include an outcome analyzer (156) for applying an outcome analysis to the analogical pattern and associated metadata to look at the noun-verb-object relationships and the categories to determine the most likely options by scoring the terms and likelihood they belong together or are should be associated. The outcome analyzer (156) may apply a learning method for previously similar analogies or noun-verb relationship in a similar pattern, along with definition extraction for the verb in relation to the noun/object characteristics and the comparator/idiomatic used. The meaning of the detected analogical pattern may be deduced at the meaning resolver (158) as a combination of the source analogic characteristic and metadata with the target analogic outcome, and then presented with the evidence from the characteristics and meaning and any corpus references that are used to help the determination.

The anaphora engine (172) and the comparator engine (174) generate an idiomatic structure and associated feature sets, which is shown and described in FIG. 1. An analyzer (178) functions as an interface between the generated idiomatic structure(s) and the corpus (160). More specifically, the analyzer (178) searches the corpus (160) for evidence of the pattern, both as an entire analogical pattern, and as a subset of a pattern. The analyzer (178) applies a score to each feature set according to its incidence in the corpus (160). An outcome (104) for the analyzer (178) is in the form of an analogical pattern that matches or closely matches the submitted sentence. More specifically, the outcome (104) is based on the scoring, and in one embodiment, associated ranking of a plurality of potential outcomes.

Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems. An illustrative example of an information handling system showing an exemplary processor and various components commonly accessed by the processor is shown and described in FIG. 2.

Figure 2:
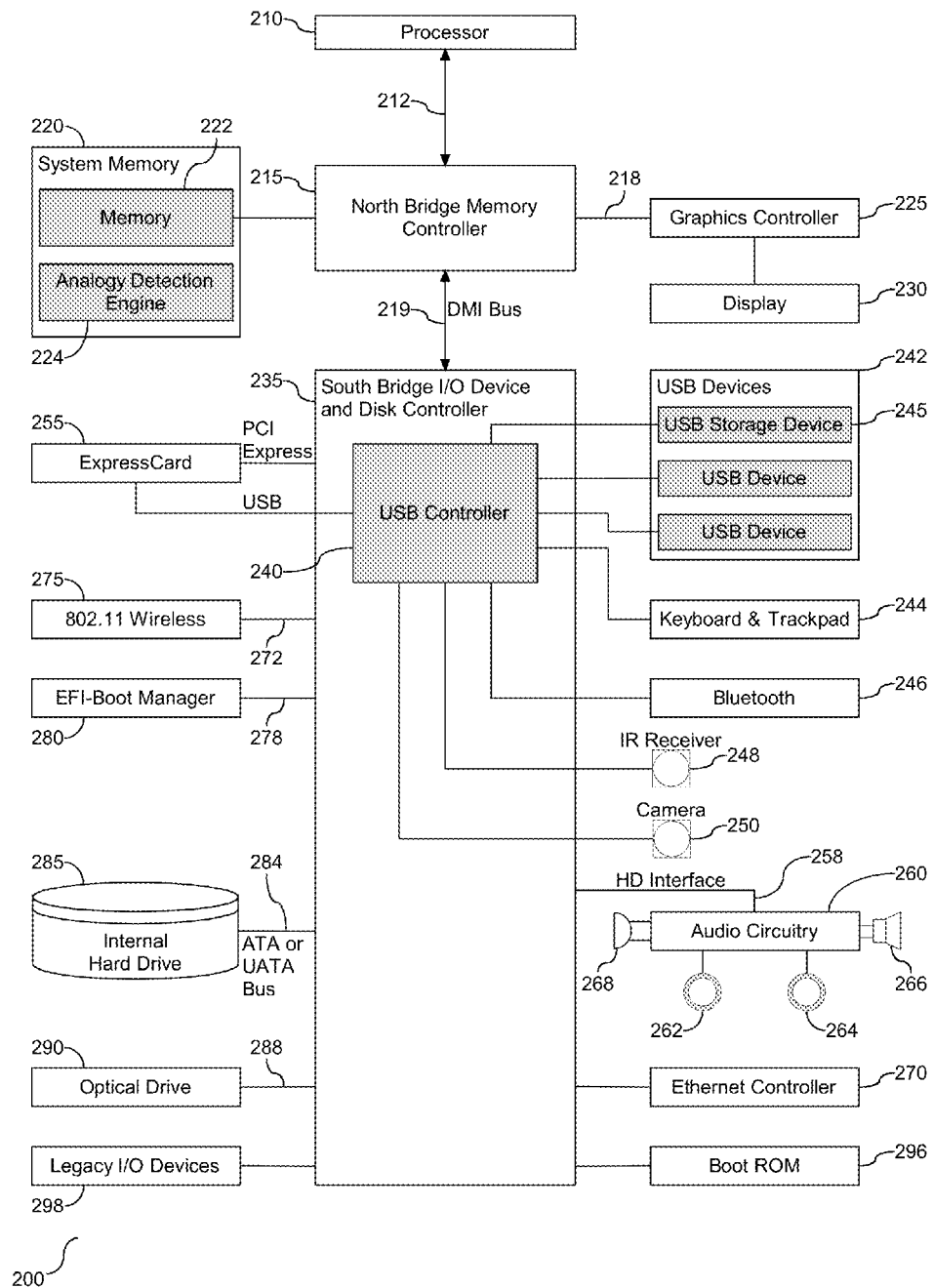
FIG. 2 depicts a block diagram of a processor and components of an information handling system such as those shown in FIG. 1.

Referring to FIG. 2, a block diagram (200) is provided illustrating information handling system. As shown, one or more processors (210) are coupled to processor interface bus (212), which connects processors (210) to Northbridge (215), which is also known as the Memory Controller Hub (MCH). Northbridge (215) connects to system memory (220) and provides a means for processor(s) (210) to access the system memory (220). In the system memory (220), a variety of programs may be stored in one or more memory devices, including an analogy detection engine (221) which may be invoked to detect an analogy by parsing or breaking a sentence into a discrete analogical pattern and then use definitions of the terms in the analogical pattern(s) to determine the potential meanings of the analogy. Graphics controller (225) also connects to Northbridge (215). In one embodiment, PCI Express bus (218) connects Northbridge (215) to graphics controller (225). Graphics controller (225) connects to display device (230), such as a computer monitor.

Northbridge (215) and Southbridge (235) connect to each other using bus (219). In one embodiment, the bus is a Direct Media Interface (DMI) bus that transfers data at high speeds in each direction between Northbridge (215) and Southbridge (235). In another embodiment, a Peripheral Component Interconnect (PCI) bus connects the Northbridge and the Southbridge. Southbridge (235), also known as the I/O Controller Hub (ICH) is a chip that generally implements capabilities that operate at slower speeds than the capabilities provided by the Northbridge (215). Southbridge (235) typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM (296) and "legacy" I/O devices (298) (using a "super I/O" chip). The "legacy" I/O devices (298) can include, for example, serial and parallel ports, keyboard, mouse, and/or a floppy disk controller. Other components often included in Southbridge (235) include a Direct Memory Access (DMA) controller, a Programmable Interrupt Controller (PIC), and a storage device controller, which connects Southbridge (235) to nonvolatile storage device (285), such as a hard disk drive, using bus (284).

ExpressCard (255) is a slot that connects hot-pluggable devices to the information handling system. ExpressCard (255) supports both PCI Express and USB connectivity as it connects to Southbridge (235) using both the Universal Serial Bus (USB) the PCI Express bus. Southbridge (235) includes USB Controller (240) that provides USB connectivity to devices that connect to the USB. These devices include webcam (camera) (250), infrared (IR) receiver (248), keyboard and trackpad (244), and Bluetooth device (246), which provides for wireless personal area networks (PANs). USB Controller (240) also provides USB connectivity to other miscellaneous USB connected devices (242), such as a mouse, removable nonvolatile storage device (245), modems, network cards, ISDN connectors, fax, printers, USB hubs, and many other types of USB connected devices. While removable nonvolatile storage device (245) is shown as a USB-connected device, removable nonvolatile storage device (245) could be connected using a different interface, such as a Firewire interface, etc.

Wireless Local Area Network (LAN) device (275) connects to Southbridge (235) via the PCI or PCI Express bus (272). LAN device (275) typically implements one of the IEEE 802.11 standards for over-the-air modulation techniques to wireless communicate between information handling system (200) and another computer system or device. Extensible Firmware Interface (EFI) manager (280) connects to Southbridge (235) via Serial Peripheral Interface (SPI) bus (278) and is used to interface between an operating system and platform firmware. Optical storage device (290) connects to Southbridge (235) using Serial ATA (SATA) bus (288). Serial ATA adapters and devices communicate over a high-speed serial link. The Serial ATA bus also connects Southbridge (235) to other forms of storage devices, such as hard disk drives. Audio circuitry (260), such as a sound card, connects to Southbridge (235) via bus (258). Audio circuitry (260) also provides functionality such as audio line-in and optical digital audio in port (262), optical digital output and headphone jack (264), internal speakers (266), and internal microphone (268). Ethernet controller (270) connects to Southbridge (235) using a bus, such as the PCI or PCI Express bus. Ethernet controller (270) connects information handling system (200) to a computer network, such as a Local Area Network (LAN), the Internet, and other public and private computer networks.

While FIG. 2 shows one information handling system (200), an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
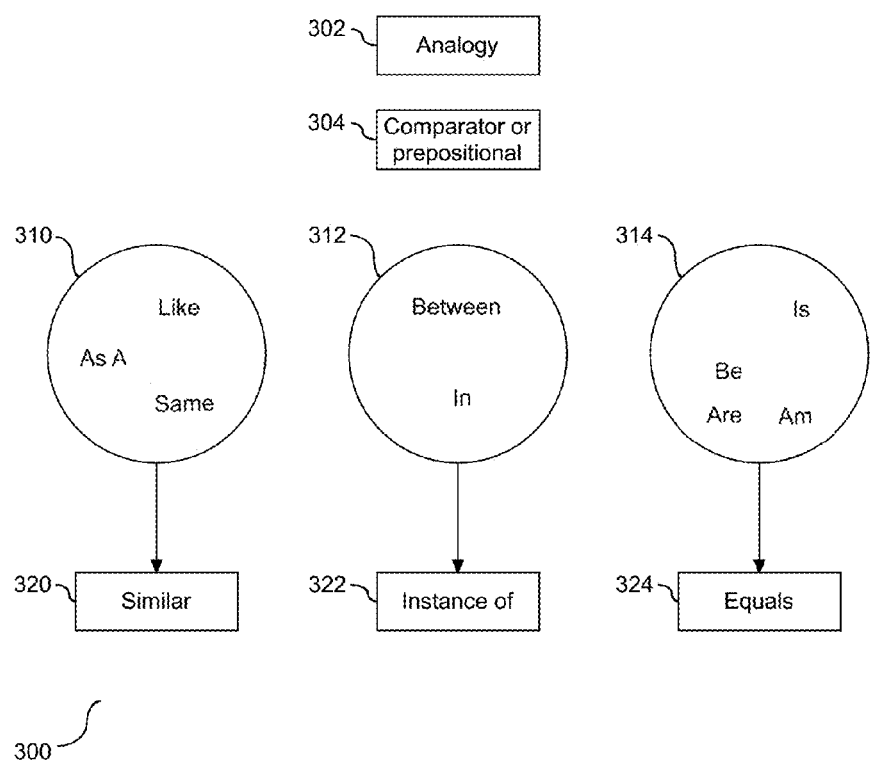
FIG. 3 depicts a block diagram illustrating the application of linguistic analysis to identify an analogical pattern.

To provide additional details for an improved understanding of selected embodiments of the present disclosure, reference is now made to FIG. 3 which diagrammatically illustrates in block diagram form prior received analogies and their resolved outcomes. More specifically, the sentence parsing tool identifies an analogy, or a previously identified analogy (302). For the subject analogy (302), the comparator or preposition used with the analogy is identified (304). Examples of the comparators or prepositions are shown at (310), (312) and (314), which are examples of the instances identified in the natural language. Resolution of each comparator or grouping of comparators is shown. More specifically, the comparators or prepositions at (310) were previously resolved to be comparable to the outcome at (320). Similarly, resolution of each comparator or grouping of comparators at (312) was previously resolved to be comparable to the outcome at (322), and the same for the grouping at (314) resolved to be comparable to the outcome at (324). In one embodiment, each analogy and associated outcome is populated into the knowledge base (160), and becomes part of the corpus to facilitate resolution of natural language input to be received. Accordingly, the resolutions of analogies shown herein are examples from other sentences and their associated resolution(s).

Figure 4:
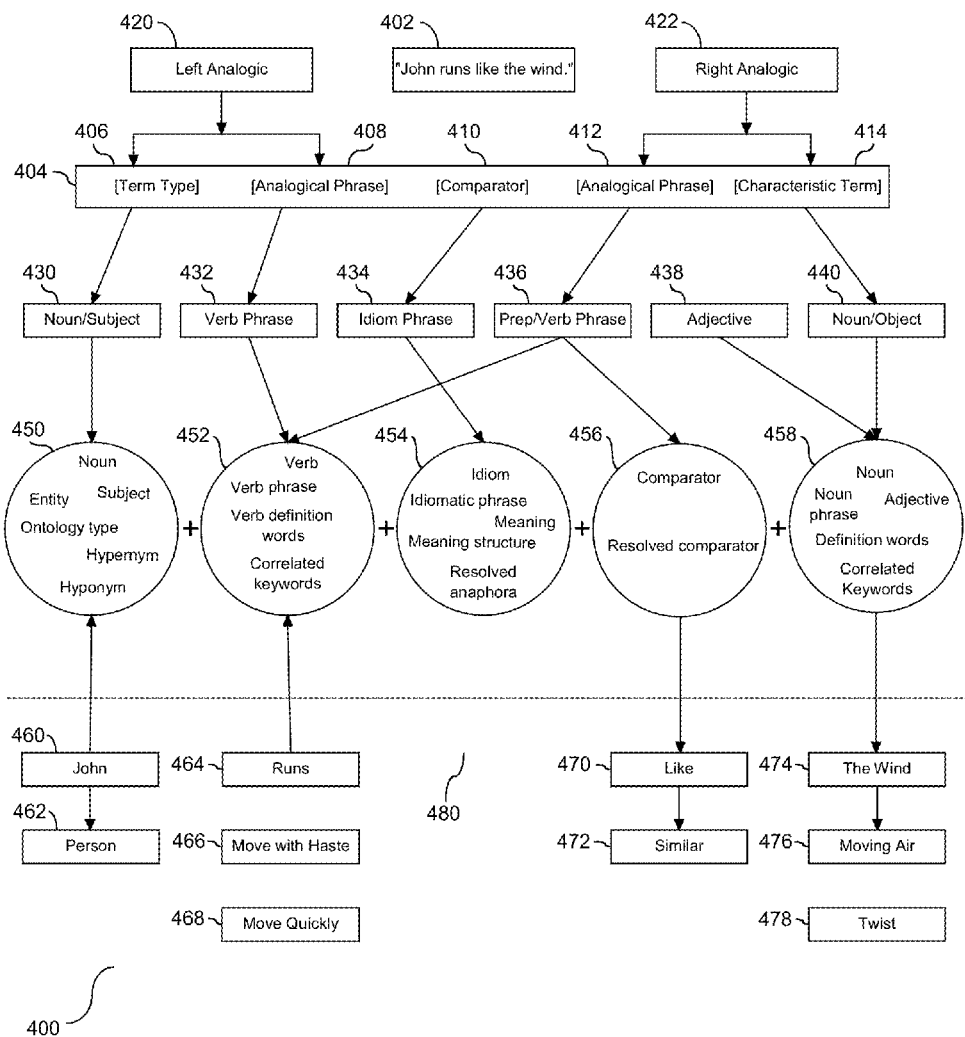
FIG. 4 depicts a block diagram illustrating application of linguistic analysis to identify an analogical pattern and the generation of associated metadata.

Referring to FIG. 4, a block diagram (400) is provided illustrating linguistic parsing and analysis to identify an analogical pattern (402) and generate associated characteristic metadata (480). As disclosed herein, the linguistic analysis processing may be performed by a natural language processing system, such as the information handling system (152) as shown in FIG. 1, or any suitable information handling system. A sentence parsing tool, such as but not limited to SGL, is applied to break a received sentence (402) into its constituent parts to find the sentence parts and location sequence. For example, the sentence "John runs like the wind" (402) is received and a parsing process applied to the sentence identifies the sentence terms and structure. As shown, the received sentence is matched with an identified analogical pattern (404). More specifically, the matching patterns includes a term type (406), an analogical phrase (408), also referred to herein as a left or first analogical phrase, a comparator (410), an analogical phrase (412), also referred to herein as a right or second analogical phrase, and a characteristic term (414). The term type (406) and the first analogical phrase (408) are referred to herein as a first or left analogic (420), and the second analogical phrase (412) and characteristic term (414) are referred to herein as a second or right analogic (422). Accordingly, through the sentence parsing tool, the structure of the sentence is identified and matched with an analogical pattern.

The sentence parsing tool or related SGL process is applied to the sentence (402) to further separate the sentence components into constituent parts (430)-(440) and associated location sequence. The sentence parsing tool identifies the terms and structures as including a subject noun term (430), a verb phrase (432), an adjective or idiom phrase (434), a preposition/verb phrase (436) and a noun/object term (440). Although not present in this example sentence, the sentence parsing tool may also identify an adjective (438). Each of the identified terms and structure may include various grammatical terms. For example, the noun term (430) may include any one of an entity, ontology type, subject, hypernym, or hyponym, as shown at (450); the verb phrase (432) and/or preposition/verb phrase (436) may include any one of a verb phrase, verb definition words, and correlated keyword, as shown at (452); the adjective or idiom phrase (434) may include any one of an idiom, idiomatic phrase, meaning, meaning structure, or resolved anaphora, as shown at (454), the preposition/verb phrase (436) may include a comparator or resolved comparator, as shown at (456); and the adjective (438) and noun/object (440) may include any one of a noun phrase, adjective, definition words, and correlated keywords (458).

Application of the received sentence (402) to the parsing tool identifies "John (460) as the subject/person (462), "run" as the verb (464) which is analogized to be 'move with haste' (466) or move quickly (468), "like" as the idiom (470) which is analogized to be 'similar' (472), and "the wind" (474) which is analogized to be 'moving air' (476) or twist (478). Depending on the language in the sentence (402), the grammatical parsing may generate different sentence terms and/or structures. To further assist with analogy detection processing, each of the parsed sentence terms or parts (430)-(440) may be further analyzed for entity resolution, ontology, and/or associated characteristics in order to generate pattern characteristic metadata (480) for use in refining the terms of the detected analogical pattern. For example, a deep analytic semantic analysis may be applied to the parsed terms (430)-(440) by using term definitions or other ontology analysis to determine that the parsed subject noun term "John" (460) is associated with the corresponding person characteristic metadata (462). Similarly, the parsed subject verb phrase "runs" (464) is associated with multiple characteristic metadata terms, including "move with haste" (466), and "move quickly" (468).

As shown, the parsed sentence terms or parts (406)-(414) and corresponding metadata (480) are categorized into an analogical pattern, shown herein as a first or left analogic (420) having the first term type (406) and the first analogical phrase (408) that is connected by a comparator (410) to a second or right analogic (422) shown herein as having the second analogical phrase (412) and the characteristic term (414). The analogical pattern categorization process may be implemented by applying a learning method to match various combinations of the parsed sentence terms or parts (406)-(414) and corresponding pattern characteristic metadata (480) to one or more known analogical patterns to decide and categorize the sentence or phrase (402) as an analogy. If the syntactic structure of a combination pattern of parsed sentence terms or parts (406)-(414) and corresponding pattern characteristic metadata (480) match a known analogical pattern, the relevant analogy terms and pattern types are identified as a candidate meaning and associated for use in subsequent processing. For example, the detected analogy pattern may be (noun like, as a, etc), and the object noun term may be pulled and associated with the object verb phrase.

Figure 5A:
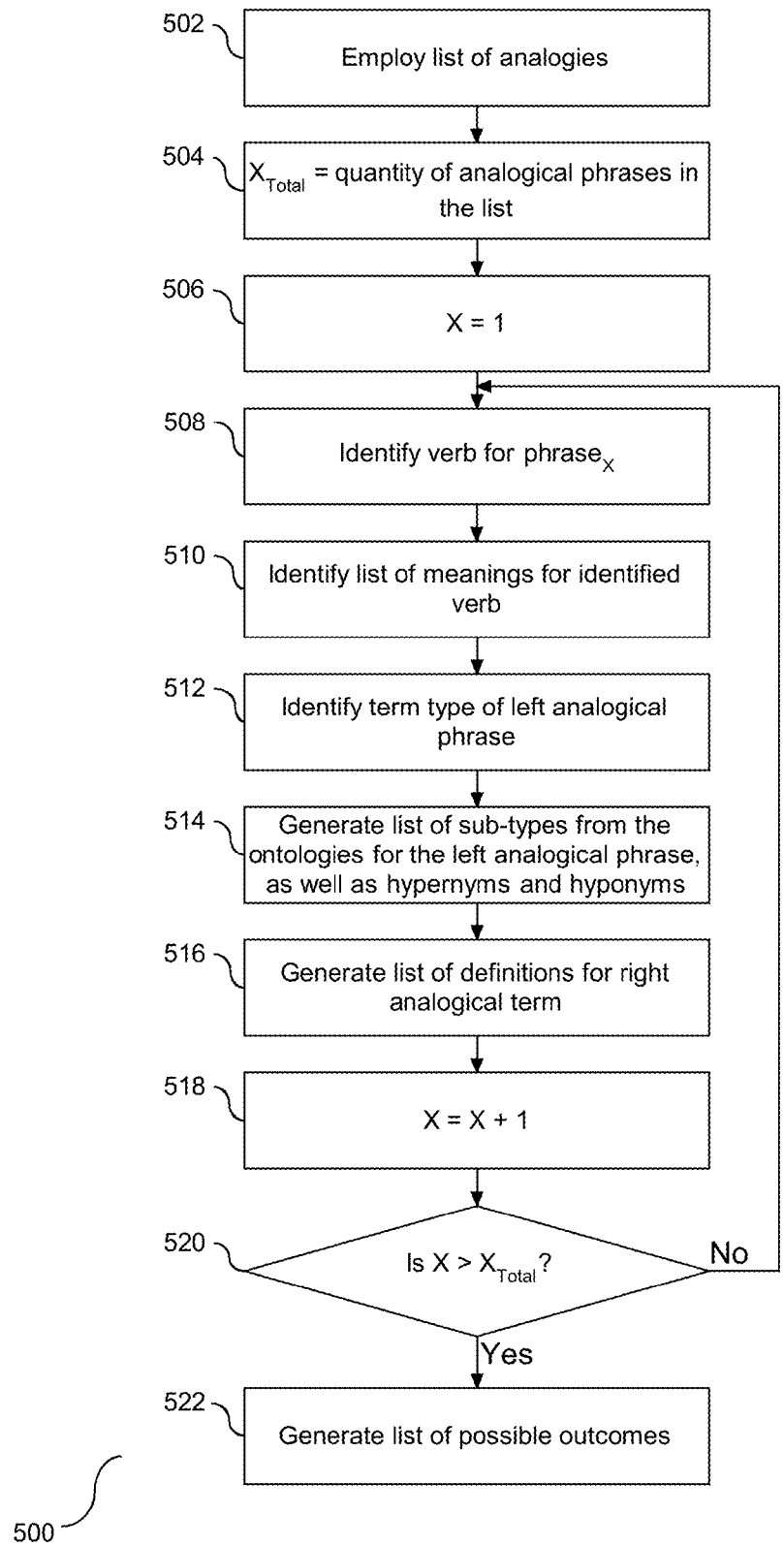
FIG. 5A depicts a flow chart illustrating the steps of evaluating an analogical phrase.

As shown in FIG. 4, a sample sentence is submitted and possible outcomes are provided. A probable outcome may be selected from the listed of possible outcomes. Referring to FIGS. 5A, a flow chart (500) is provided illustrating a process for resolving an outcome of an analogy. As shown, a list of analogies with known meanings is employed (502). The variable $X_{Total}$ is assigned to the quantity of analogical phrases in the list (504), and an associated analogical phrase counting variable is initialized (506). For each analogical phrase$_x$, the verb is identified (508), and a list of meanings for the verb is also identified (510). In addition, the term type from the left analogical phrase is identified (512). For example, the term type at step (512) may be a person, machine, etc. A list of sub-types from the ontologies for the left analogical phrase, as well as hypernyms and hyponyms are generated (514). An example of the list of sub-types from step (514) is shown and described in FIG. 6. Examples of the sub-types in the list at step (514) may include, but are not limited to, athlete, person, mammal, animals, etc. Following step (514), a list of definitions for the right analogical term is generated (516). In one embodiment, any present adjective associated with the term may be employed to narrow the list of possible definitions. An example of the list of definitions with adjectives is shown and described in FIG. 7. After the completion of step (516), the analogy phrase counting variable is incremented (518), and it is determined if all of the analogies have been processed (520). A negative response to the determination at step (520) is followed by a return to step (508), and a positive response to the determination at step (520) concludes the processing of analogical phrases.

Figure 5B:
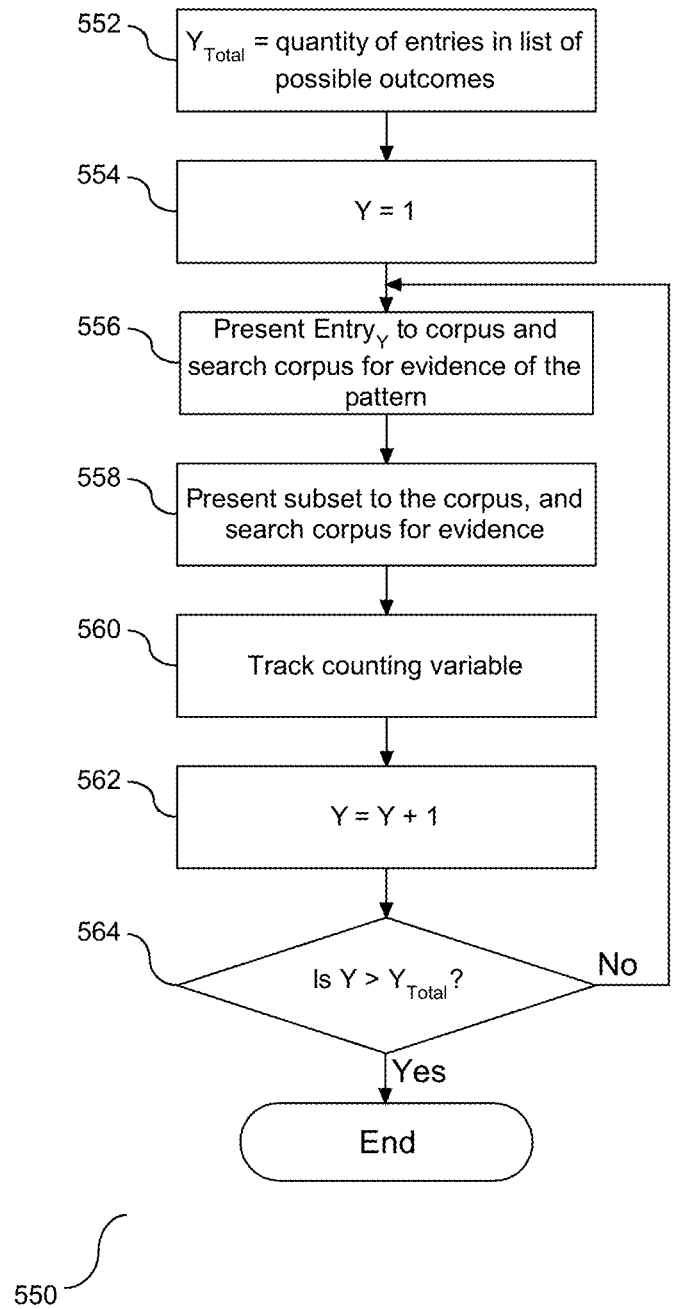
FIG. 5B depicts a flow chart illustrating the steps of generating an outcome from a parsed analogical phrase.

Following the process of evaluating the analogical phrase, as demonstrated by a positive response to the assessment at step (520), a list of possible outcomes is generated (522). An example of the list of possible outcomes is shown and described in FIG. 8. The list is subject to interpretation. Referring to FIG. 5B, a flow chart (550) is provided illustrating a process for evaluation of one or more features in the list generated in FIG. 5A, see step (522). The variable $Y_{Total}$ is assigned to the quantity of entries in the list (552), and an associated counting variable, Y, is initialized (554). Entry$_Y$ is presented to a corpus, and the entire analogical pattern associated with entry is searched in the corpus for evidence of the pattern (556). Similarly, a subset of the pattern in Entryy is presented to the corpus and a search is conducted in the corpus for evidence of the subset (558). In one embodiment, the search of the corpus for the subset at step (558) functions as an adjustment to the search for the entire pattern at step (556). A counting variable for each matching feature set is tracked (560) so that the quantity of the amount of times the feature set is found in the corpus is assessed. Following step (560), the list entry counting variable, Y, is incremented (562), and it is determined if all of the entries have been evaluated and subject to a search in the corpus (564), as shown and described at steps (556) and (558). A negative response to the determination at step (564) is followed by a return to step (556), and a positive response concludes the evaluation of the list of possible outcomes.

Figure 9:
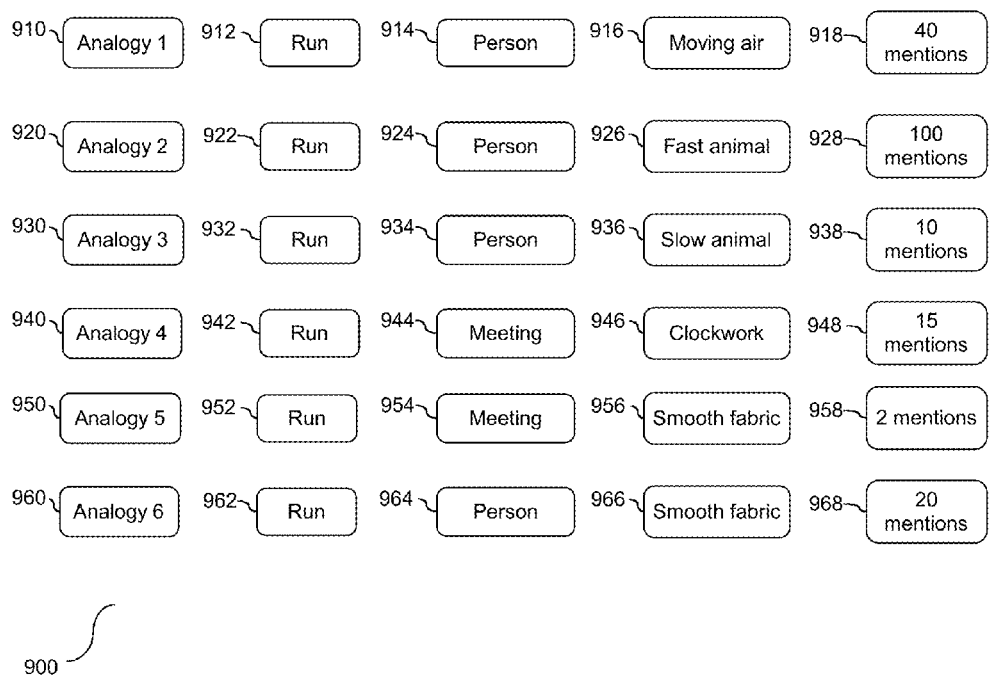
FIG. 9 depicts a block diagram illustrating the results of the comparison between phrases and analogies with the same terms in the corpus.

As shown, evidence of each outcome is presented to the corpus, and the quantity of matches is tracked. Referring to FIG. 9, a block diagram (900) of the list of entries and the corpus search results are shown and described. The list is subject to sorting so that each feature set is presented according to its incidence in the corpus (918), (928), (938), (948), (958), and (968). In one embodiment, the counter associated with each feature set functions as a weight applied to the feature set. Based upon the score or weight (918), (928), (938), (948), (958), and (968), the outcome of the analogy is resolved (980), which is herein shown based on evidence of incidence from the corpus. The intended meaning of the analogical phrases is derived with evidence from the corpus. Accordingly, as shown herein, a machine learning model is employed to recognize an analogy and determine a meaning or intended meaning of the analogy. FIG. 9 is explained in greater detail below.

Figure 6A:
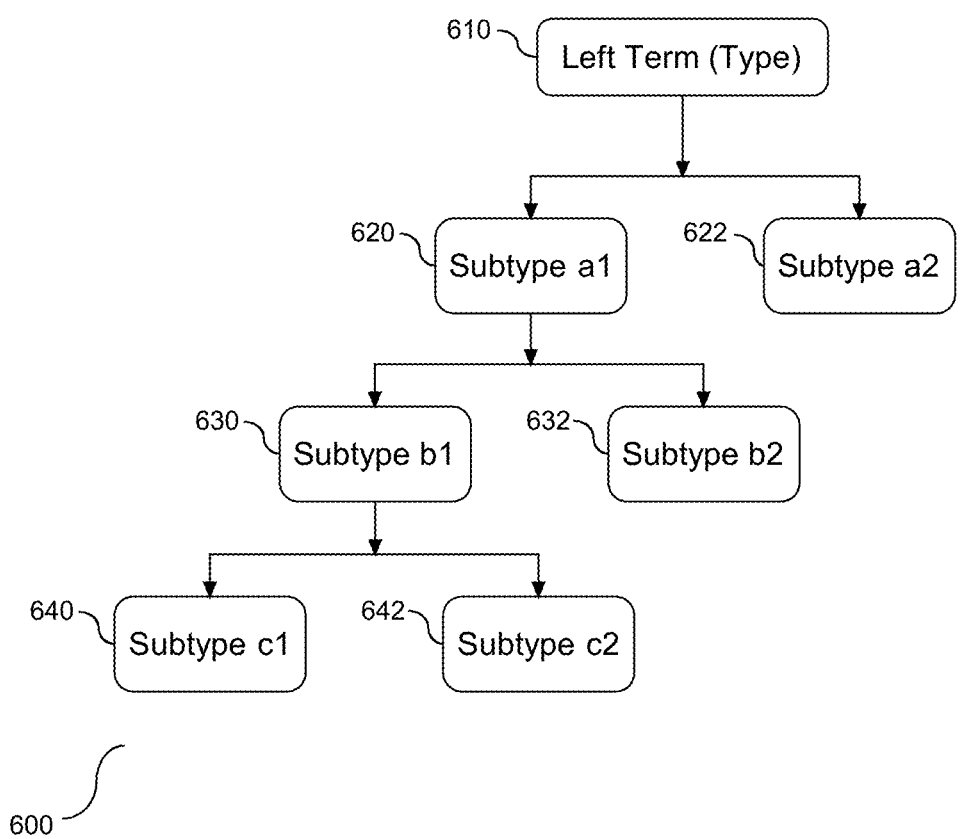
FIG. 6A depicts a block diagram illustrating an abstract application of an embodiment of linguistic analysis to identify an analogical pattern.
Figure 6B:
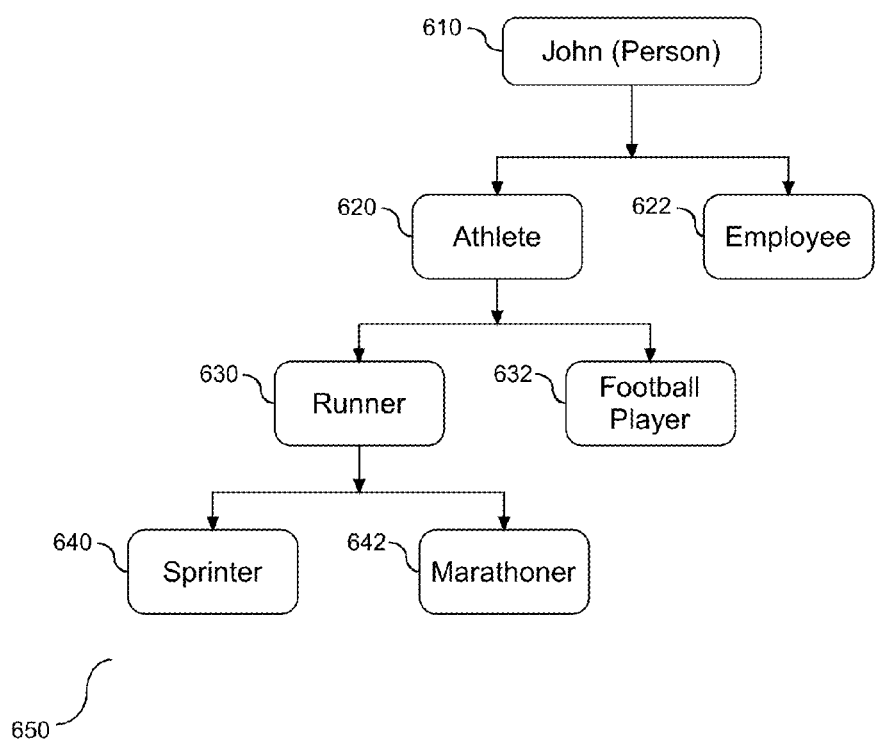
FIG. 6B depicts a block diagram illustrating an application of an embodiment of linguistic analysis to identify an example analogical pattern.

Referring to FIGS. 6A and 6B, block diagrams (600) and (650), respectively, are provided illustrating lists of subtypes from the ontologies for the left analogical phrase, as identified in FIG. 4. As shown in FIG. 6A, the left term type (610) is identified as a person, with two potentially identified subtypes (620) and (622). Based on the example shown in FIG. 4, the person identified at (610) is 'John'. The two subtypes (620) and (622) reference the identified person as either an athlete (620) or an employee (622). The first subtype (620) is shown as expanded to add potential characteristics in the form of further subtypes (630) and (632). In one embodiment, the subtypes (630) and (632) are found by performing an ontological lookup match for the subtype identified at (620). In this example, the further subtypes identify types of athletes, such as a runner (630) and a football player (632). A hypernym match may be performed on the subtype identified at (630) to create a further subtype (640), shown herein as a sprinter, which in one embodiment is a type of runner. Similarly, a hyponym expansion on the subtype identified at (630) creates a further subtype (642), shown herein as a marathoner. Each type (620) and subtype (630)-(642) may be employed as keywords to define the right analogical phrase. Accordingly, the subtypes identified herein come from extrapolating the subject of the left analogical phrase, and may be employed as keyword in the machine learning tool.

Figure 7:
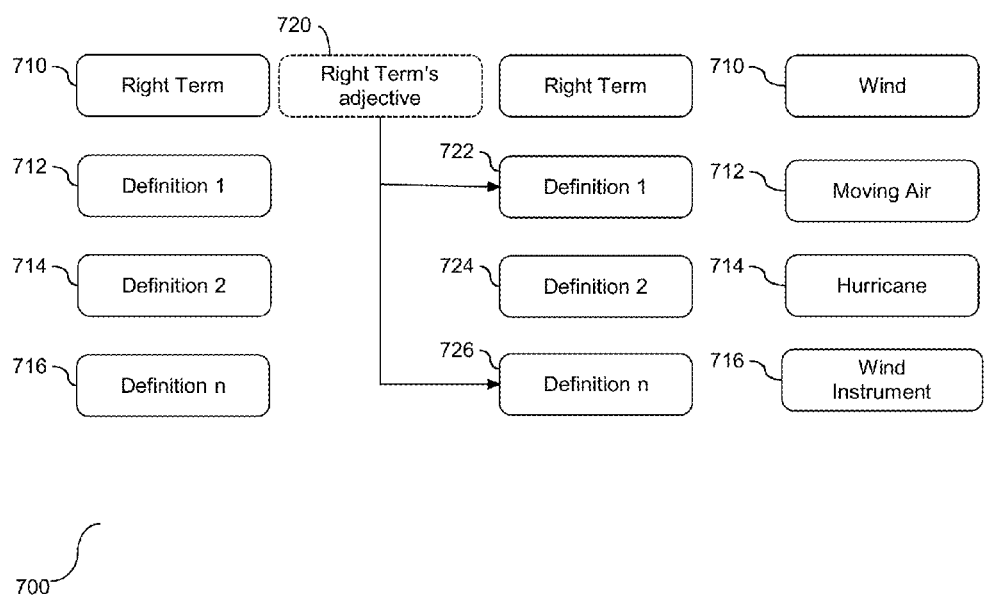
FIG. 7 depicts a block diagram illustrating definitions that relate to a noun.

Referring to FIG. 7, a block diagram (700) is provided illustrating an example of the list of definitions for the right analogical phrase. The right analogical phrase, which is also referred to herein as a right term, is shown at (710). Based on the example of FIG. 4, the right term (710) is identified as 'wind'. Three definitions are shown that relate to the right term, including (712), (714), and (716). In one embodiment, the definitions are found from one or more conventional dictionaries. Similarly, in one embodiment, an adjective for the right term is identified (720) and definitions for the adjective are found and identified at (722), (724), and (726). Accordingly, the subtypes of the right term shown herein come from employing a dictionary, or an equivalent tool, to ascertain the definition of the term, with each definition classified as a subtype of the right term.

Figure 8A:
FIG. 8A depicts a block diagram illustrating an abstract matrix of analogical pattern subcomponents.

Referring to FIG. 8A, a block diagram (800) is provided illustrating an abstract representation of the possible outcomes for the analogy. In this example, there are four analogies represented (810), (820), (830), and (840). Each analogy is shown with a verb, a left term, as shown and described in FIG. 6A, a definition, as shown and described in FIG. 7, and an outcome generated for the identified analogy. The first analogy (810) includes verb (812), left term (814), right term (816), and outcome (818); the second analogy (820) includes verb (822), left term (824), right term (826), and outcome (828); the third analogy (830) includes verb (832), left term (834), right term (836), and outcome (838); and the fourth analogy (840) includes verb (842), left term (844), right term (846), and outcome (848). The analogies and associated outcomes are shown as an abstract representation.

Figure 8B:
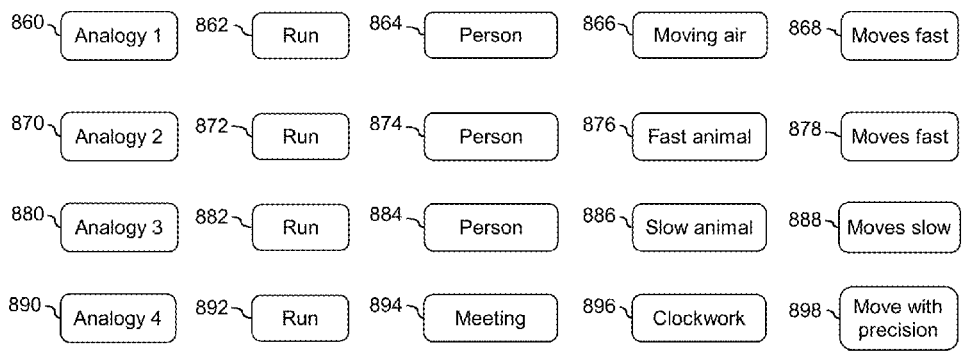
FIG. 8B depicts a block diagram illustrating an example applied matrix of analogical pattern subcomponents.

A non-abstract representation of the possible outcomes for the analogies shown in FIG. 8A is shown and described in a block diagram (850) in FIG. 8B. As shown and described, the non-abstract representation employs specific words in the verbs, left subtypes, right subtypes, and outcomes. Each of the terms shown herein are based on the example of FIG. 4, and should not be considered limiting. As shown, first analogy (860) includes verb (862), left term (864), right term (866), and outcome (868); the second analogy (870) includes verb (872), left term (874), right term (876), and outcome (878); the third analogy (880) includes verb (882), left term (884), right term (886), and outcome (888); and the fourth analogy (890) includes verb (892), left term (894), right term (896), and outcome (898). Accordingly, the outcomes shown at (868), (878), (888), and (898) shown concrete examples of different outcomes based on the application of analogies, terms, and subtypes.

As shown and described in FIG. 6B, the machine learning process presents the entire analogical pattern to the corpus to search for evidence of the pattern, and also presents a subset of the analogical pattern to the corpus for evidence. Referring to FIG. 9, a block diagram (900) is provided illustrating the results or outcome of presenting the representation of analogies shown in FIG. 8B to the corpus. The analogy presentation includes the verb, left subtype, and definition, together with the quantity of times the analogy was found in the corpus. As shown, first analogy (910) includes verb (912), left term (914), definition (916), and outcome quantity (918); the second analogy (920) includes verb (922), left term (924), definition (926), and outcome quantity (928); the third analogy (930) includes verb (932), left term (934), definition (936), and outcome quantity (938); and the fourth analogy (940) includes verb (942), left term (944), definition (946), and outcome quantity (948). Each of the outcomes quantity is different. In this example, outcome (918) shows 40 mentions, outcome (928) shows 100 mentions, outcome (938) shows 10 mentions, and outcome (948) shows 15 mentions. In one embodiment, the outcome quantity as evidenced through presentation to the corpus is an example of applying a score to the feature set, which may be sorted according to the quantity of mentions returned from the corpus. In the example shown herein, clearly, the second analogy (920) is the most prevalent, with the closest analogy thereafter being the first analogy (910). The machine learning model demonstrates that a person running is likely the analogy of the presented phrase. Accordingly, the outcome provided in this example presents the version of the verb employed in the analogy.

Embodiments may be in the form of a system with an intelligent computer platform for deciphering analogical phrases. A processing unit is operatively coupled to memory and is in communication with an artificial intelligence platform. A tool or analogy detection engine (154), also in communication with the processing unit, is employed to decipher a phrase upon activation by the artificial intelligence platform. The procedure of deciphering the phrase includes parsing a phrase into subcomponents, identifying a category for each parsed subcomponent and a syntactic structure of the phrase, and generating a list of definitions for each parsed subcomponent. The category may be a noun, entity, subject, hypernym, hyponym, verb, comparator, idiom, adjective, or a combination of these. The generated list corresponds to the identified category. Each definition may be a meaning of each parsed subcomponent or a meaning of the analogical phrase.

The tool (154) ranks the definitions in the list according to relevance and identifies an outcome based on relevancy, the outcome being a definition with the highest relevance in the list. The definition ranking may be via filtering of the definitions based on the parsed subcomponent having similar adjectives or adverbs, depending on the category of the subcomponent. The tool (154) continues by searching a corpus for evidence of a pattern associated with the list, scoring each definition in the list according to a weighted calculation based on congruence of corpus evidence with the pattern, and generating an outcome. The generated outcome is the definition with the strongest congruence to the pattern.

Alternatively, the tool (154) may commence deciphering the phrase by comparing a conversation to an analogy classifier database to identify a match between the analogical pattern and an analogy entry. Upon identifying a match, the tool (154) generates an idiomatic structure from the analogical pattern and applies an analysis. The analysis may include building a set of outcomes of the generated idiomatic structure based on semantic analysis into corresponding metadata for the idiomatic structure. The set of outcomes for the terms in the analogical pattern may include a definition, a subject term, a first verb phrase, a second verb phrase, a comparator, or an object. The tool (154) resolves the comparator, including employ evidence of the comparator in the corpus and incorporating the comparator evidence into the set of outcomes of the generated idiomatic structure. The tool (154) may further expand the metadata of the analogical pattern, wherein the expansion may include generating a list of sub-types from ontology terms in the analogical pattern. The tool (154) may also identify an adjective associated with the second verb phrase and apply the adjective to filter the list of sub-types. The tool (154) may perform a hyponym expansion for one or more of the sub-types in the list, including searching the corpus of evidence of the hyponym expansion and applying a score to each hyponym according to its incidence in the corpus. The tool (154) may perform a hypernym expansion, in addition to or alternatively to the hyponym expansion, for one or more of the sub-types in the list, including searching the corpus of evidence of the hypernym expansion and applying a score to each hypernym according to its incidence in the corpus.

The deciphering procedure continues by enabling a search of an ontological database, or corpus, for evidence of a pattern associated with the set of outcomes, score each entry in the outcome set according to a weighted calculation from the ontological database based on congruence with the pattern, and select an entry from the outcome set based on the scoring. Scoring each entry in the outcome set may further include applying a weight to each entry in the outcome set, wherein the weight is based on an incidence of direct and indirect matches in the corpus. The corpus may be populated by the tool (154) with meaning or explanation of the analogical pattern. Also, the tool (154) may further adjust the outcome, the adjustment including searching the corpus of evidence of the sub-types from ontologies of the first verb phrase. The tool (154) completes the task of assessing the analogy presented by converting the selected entry into a meaning of the analogical pattern. If the tool (154) fails to find evidence of a pattern associated with the set of outcomes in the ontological database, the tool (154) may search a corpus for evidence of a pattern associated with the set of outcomes and score each entry in the outcome set according to a weighted calculation from the corpus based on congruence with the pattern.

In another embodiment, the tool (154) may parse a phrase into a set of terms to reveal an analogical pattern, categorize the set of terms according to syntactic placement and place the terms into two or more categories according to word type patterns in the phrase in order to produce metadata. The tool (154) then matches the metadata to outcome metadata generated from a set of outcomes produced from data storage, generates a set of grammatical data for each potential outcome, and trains a statistical model. The training includes ranking each potential outcome according to degree of congruence with the syntactic placement and word type patterns of the phrase. A highest outcome is then selected, whereby the highest outcome is the potential outcome with the highest rank. The tool (154) applies a confidence level data metric to the highest outcome. If the confidence level is high, the tool (154) would output the highest outcome. If the confidence level is low, the tool (154) sends the highest outcome to a client machine where it would be used to adjust the highest outcome and generate an adjusted outcome. The adjusted outcome would then be sent back to the tool (154) and saved to the data storage.

In yet another embodiment, the tool (154), in communication with the processing unit in order to decipher a phrase upon activation by the artificial intelligence platform, may obtain an analogy list from memory. Each analogy within the analogy list has a known meaning. The tool (154) receives an analogy phrase. The analogy phrase may be delivered from an artificial intelligence platform, another application, another computer, electronic device, etc. At least one verb is identified within the analogy phrase. A verb definition list is generated for the identified verb and a subject is identified within the analogy phrase. A subject definition list is then generated for the identified subject. The subject list has a relative term of the subject which can be either a hypernym or a hyponym. The tool (154) identifies an adjective within the analogy phrase. An adjective definition list is subsequently generated for the identified adjective by filtering adjectives to accept adjective definitions associated with the identified subject and discarding non-associated definitions. A set of outcomes are identified, with each outcome set including a verb definition, a subject definition, and an adjective definition. The tool (154) searches a corpus for evidentiary use of each outcome in the identified set of outcomes. According to the level of detected evidentiary use in the corpus, the outcomes are ranked and the outcome with the highest ranking is outputted.

Embodiments may also be in the form of a computer program device for use with an intelligent computer platform in order to assist the intelligent computer platform to decipher analogical phrases. The device has program code embodied therewith. The program code is executable by a processing unit to parse a phrase into subcomponents, identify a category for each parsed subcomponent and a syntactic structure of the phrase, and generate a list of definitions for each parsed subcomponent, the list corresponding to the identified category. The parsing may be performed in accordance to SGL or any other form of natural language processing. The category may be a noun, entity, subject, hypernym, hyponym, verb, comparator, idiom, adjective, or any combination of these. Each definition may be a meaning of each parsed subcomponent or a meaning of the complete phrase.

The processing unit ranks the definitions in the list according to relevance and identifies an outcome base on ranked relevancy. Relevance is computed by comparing the number of mentions in the corpus, as shown in FIG. 9. Accordingly, a definition with more mentions in the corpus will be understood to have higher relevance and will thus receive a higher rank. The ranking of the definitions may be done by filtering the definitions based on similar adjectives or adverbs, depending on the category of the defined subcomponent. The processing unit then continues on to search a corpus for evidence of a pattern associated with the list, score each definition in the list according to a weighted calculation based on congruence of corpus evidence with the pattern, and generate an outcome.

Alternatively, program code may be executable by a processing unit to compare a conversation to an analogy classifier database to identify a match between the analogical pattern and an analogy entry. If the processing unit identifies a match, the processing unit generates an idiomatic structure from the analogical pattern and applies an analysis. The processing unit may expand the metadata of the analogical pattern, whereby the expansion includes generating a list of sub-types from ontology terms in the analogical pattern. The analysis includes building a set of outcomes of the generated idiomatic structure based on semantic analysis into corresponding metadata for the idiomatic structure. The set of outcomes for the terms in the analogical pattern may include definitions, a subject terms, verb phrases, comparators, or objects. The processing unit resolves the comparator, which includes employing evidence of the comparator in the corpus and incorporating the comparator evidence into the set of outcomes of the generated idiomatic structure. An adjective associated with the second verb phrase may be identified and applied to the adjective to filter the set of outcomes. The processing unit performs a hypernym expansion, in addition to or alternatively to the hyponym expansion, for one or more of the sub-types in the list, including searching the corpus of evidence of the hypernym expansion and applying a score to each hypernym according to its incidence in the corpus.

The processing unit searches an ontological database, or corpus, for evidence of a pattern associated with the set of outcomes, scores each entry in the outcome set according to a weighted calculation from the ontological database based on congruence with the pattern, and selects an entry from the outcome set based on the scoring. Each entry in the outcome set is scored by applying a weight to each entry, the weight based on an incidence of direct and indirect matches in the corpus. The outcome may be adjusted by searching the corpus of evidence of the sub-types from ontologies of the first verb phrase. The processing unit completes the program coded task by converting the selected entry into a meaning of the analogical pattern. The processing unit may perform a hyponym expansion for one or more of the sub-types in the list, including searching the corpus of evidence of the hyponym expansion and applying a score to each hyponym according to its incidence in the corpus. If evidence of a pattern associated with the set of outcomes in the ontological database is not found, the processing unit searches a corpus for evidence of a pattern associated with the set of outcomes and scores each entry in the outcome set according to a weighted calculation from the corpus based on congruence with the pattern.

In another embodiment, the program code may be executable by a processing unit to parse a phrase into a set of terms to reveal an analogical pattern, categorize the set of terms according to syntactic placement and place the terms into two or more categories according to word type patterns in the phrase in order to produce metadata. The processing unit matches the metadata to outcome metadata generated from a set of outcomes produced from data storage, generates a set of grammatical data for each potential outcome, and trains a statistical model. The training includes weighing and ranking each potential outcome according to degree of congruence with the syntactic placement and word type patterns of the phrase. A highest outcome is selected, whereby the highest outcome is the potential outcome with the highest rank. The processing unit applies a confidence level data metric to the highest outcome. If the confidence level is high, the processing unit outputs the highest outcome. If the confidence level is low, the processing unit sends the highest outcome to a client machine where it would be used to adjust the highest outcome and generate an adjusted outcome. The adjusted outcome is returned to the processing unit and saved to the data storage.

In yet another embodiment, the embedded program code may be executable by a processing unit to first obtain an analogy list. Each analogy within the analogy list having a known meaning. The processing unit receives an analogy phrase, which may be delivered from an artificial intelligence platform, another application, another computer, electronic device, etc. At least one verb is identified within the analogy phrase. A verb definition list is generated for the identified verb and a subject is identified within the analogy phrase. A subject definition list is then generated for the identified subject. The subject list has a relative term of the subject which can be either a hypernym or a hyponym. The processing unit identifies an adjective within the analogy phrase. An adjective definition list is subsequently generated for the identified adjective by filtering adjectives to accept adjective definitions associated with the identified subject and discarding non-associated definitions. A set of outcomes are identified, with each outcome set including a verb definition, a subject definition, and an adjective definition. The processing unit searches a corpus for evidentiary use of each outcome in the identified set of outcomes. According to the level of detected evidentiary use in the corpus, the outcomes are ranked and the outcome with the highest ranking is outputted.

Figure 10:
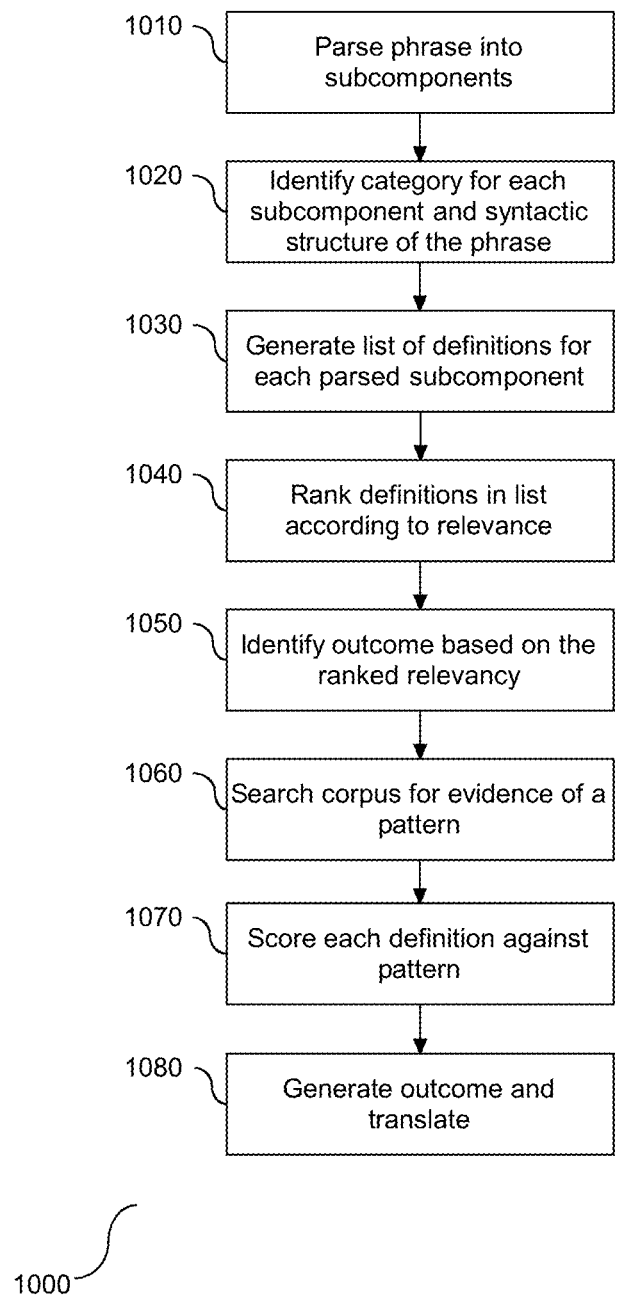
FIG. 10 depicts a flowchart illustrating steps, for use by an intelligent computer platform, for deciphering analogical phrases.

With respect to FIG. 10, a flow chart (1000) is provided illustrating an aspect of embodiments that may also take the form of a method for use by an intelligent computer platform for deciphering analogical phrases. The method includes parsing a phrase into subcomponents (1010), identifying a category for each parsed subcomponent and a syntactic structure of the phrase (1020), and generating a list of definitions for each parsed subcomponent (1030). The parsing at (1010) may be performed in accordance to Slot Grammar Logic or any other form of natural language processing. The category may be a noun, entity, subject, hypernym, hyponym, verb, comparator, idiom, adjective or any combination of these. Each definition may be a meaning of each parsed subcomponent or a meaning of a phrase, i.e. set of subcomponents. The method continues by ranking the definitions in the list according to relevance and identifying an outcome base on ranked relevancy (1050). The ranking of the definitions (1040) may be based on subcomponents with similar adjectives or adverbs, depending on the category of the defined subcomponent. A corpus is searched for evidence of a pattern associated with the list (1060). Each definition in the list is scored according to a weighted calculation based on congruence of corpus evidence with the pattern (1070), and an outcome is generated (1080) with the outcome being a definition with the strongest congruence to the pattern. Accordingly, as demonstrated herein, machine learning is utilized to ascertain and/or interpret the definition of a phrase.

Figure 11:
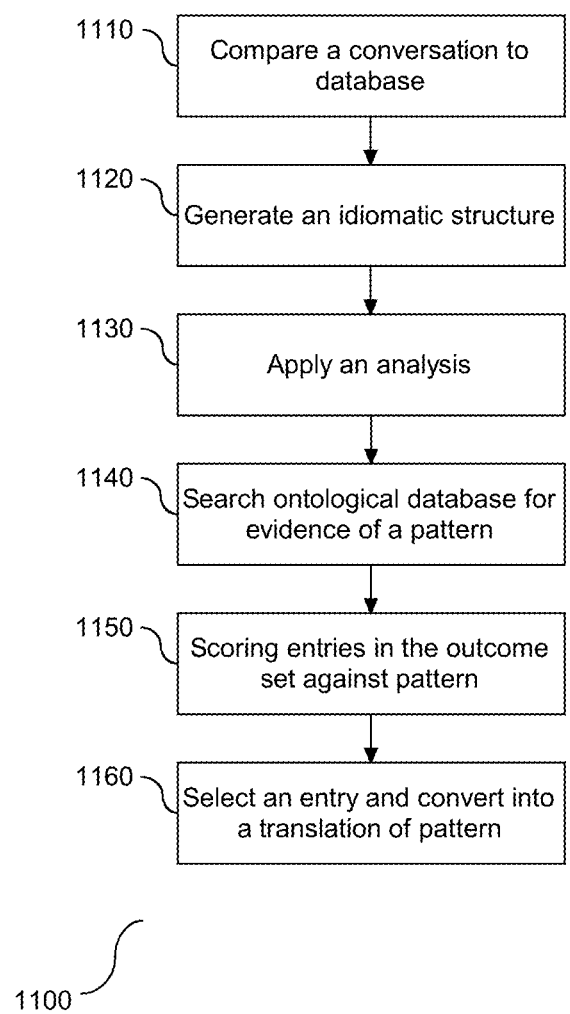
FIG. 11 depicts a flowchart illustrating steps, utilized by an information handling system, to resolve a definition of an analogical pattern.

Referring to FIG. 11, a flow chart (1100) is provided illustrating a method utilized by an information handling system comprising a processor and memory, to resolve a definition of an analogical pattern. A conversation is compared to an analogy classifier database (1110) to identify a match between the analogical pattern and an analogy entry. Metadata of the analogical pattern may be expanded whereby a list is generated of sub-types from ontology terms in the analogical pattern. If a match is identified, an idiomatic structure is generated (1120) from the analogical pattern and an analysis is applied (1130). Applying the analysis (1130) includes building a set of outcomes of the generated idiomatic structure based on semantic analysis into corresponding metadata for the idiomatic structure. The set of outcomes for the terms in the analogical pattern may include definitions, subject terms, verb phrases, comparators, or objects. An adjective associated with the second verb phrase may be identified and applied to filter the set of outcomes.

An ontological database is searched for evidence of a pattern associated with the set of outcomes (1140) and each entry is scored in the outcome set according to a weighted calculation from the ontological database and based on congruence with the pattern (1150). Scoring each entry in the outcome set (1150) may further entail applying a weight to each entry in the outcome set whereby the weight is based on an incidence of direct and indirect matches in the corpus. An entry is selected from the outcome set based on the scoring (1160). The outcome may be adjusted by searching the corpus of evidence of the sub-types from ontologies of the first verb phrase. The selected entry is outputted as a meaning of the analogical pattern (1160). A hyponym expansion may be performed for one or more of the sub-types in the list, including searching the corpus of evidence of the hyponym expansion and applying a score to each hyponym according to its incidence in the corpus. Alternatively or additionally, the same process may be done for a hypernym expansion. The corpus is populated with the meaning of the analogical pattern by submitting the selected entry into the corpus. If evidence of a pattern associated with the set of outcomes is not found in the ontological database, the corpus is searched for evidence of a pattern associated with the set of outcomes and each entry in the outcome set is scored according to a weighted calculation from the corpus based on congruence with the pattern.

Figure 12:
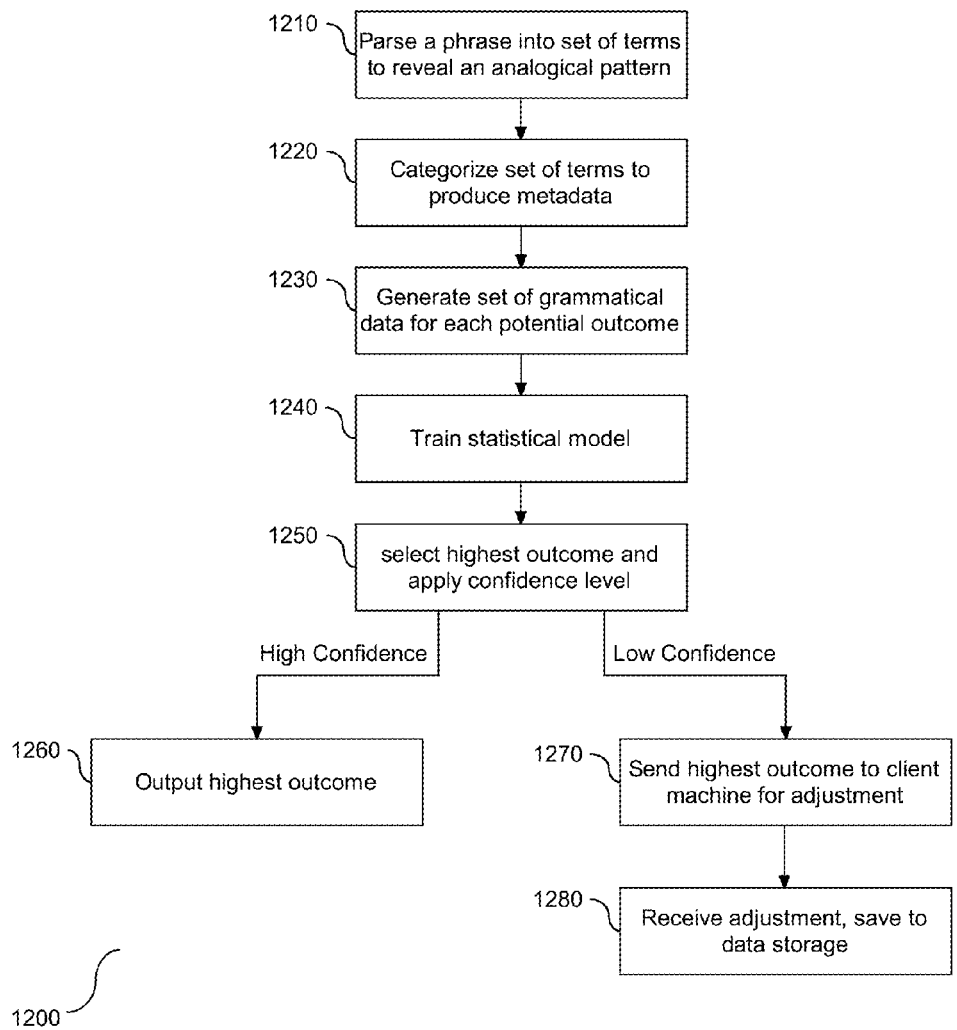
FIG. 12 depicts a flowchart illustrating an embodiment for generating a training set for an analogy outcome.

Referring to FIG. 12, a flow chart (1200) is provided illustrating an embodiment for generating a training set for an analogy outcome. A phrase is parsed into a set of terms to reveal an analogical pattern (1210) and the set of terms are categorized according to syntactic placement (1220). In one embodiment, the terms are placed into two or more categories according to word type patterns in the phrase. The categorization is documented as metadata (1220). The metadata is matched to outcome metadata generated from a set of outcomes produced from data storage. A set of grammatical data is generated (1230) for each potential outcome and a statistical model is trained (1240). In one embodiment, training a statistical model (1240) may include weighing and ranking each potential outcome according to degree of congruence with the syntactic placement and word type patterns of the phrase. A highest potential outcome is selected (1250), whereby the highest outcome is a potential outcome with the highest rank. A confidence level data metric is subsequently applied to the highest outcome (1250). If the confidence level is high, the highest outcome is outputted (1260). If the confidence level is low, the highest outcome is sent to a client machine which is used to adjust the highest outcome and generate an adjusted outcome (1270). The adjusted outcome is then received and saved to data storage (1280).

Figure 13:
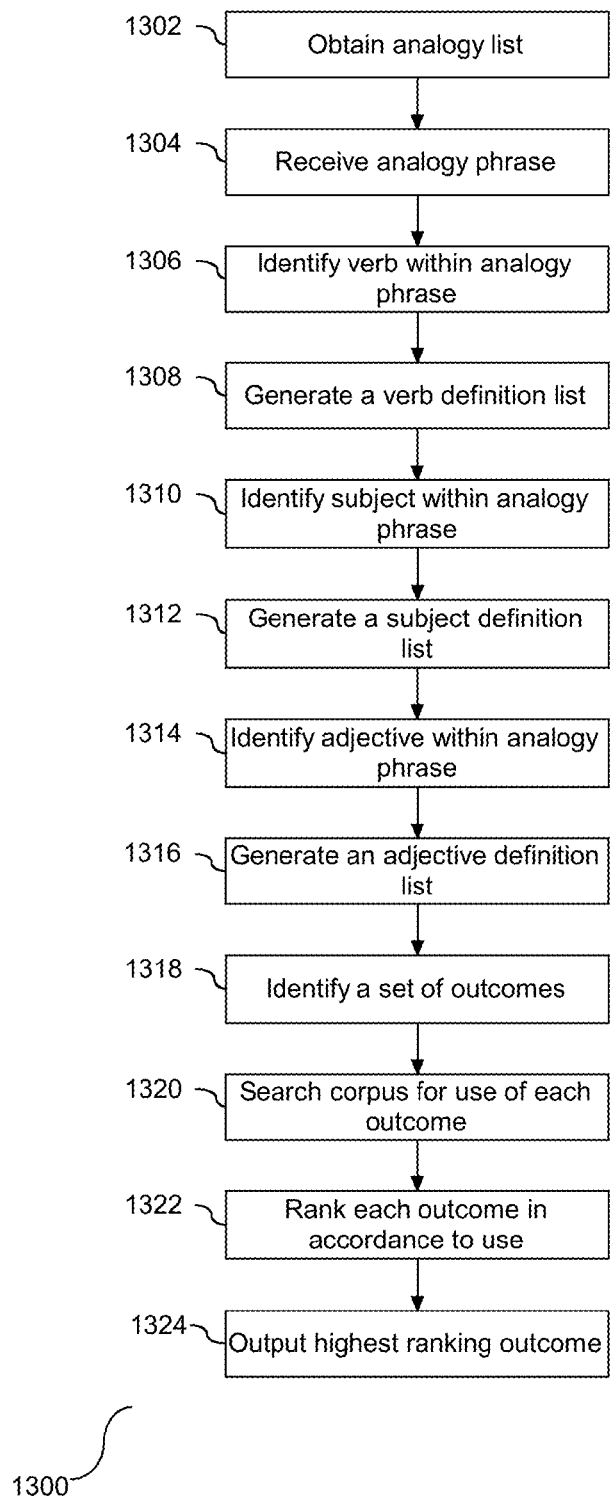
FIG. 13 depicts a flowchart illustrating steps for utilizing an information handling system to decipher a phrase.

Referring to FIG. 13, a flow chart (1300) is provided illustrating another embodiment of a method for utilizing an information handling system to decipher a phrase. An analogy list is obtained from memory (1302), with each analogy within the analogy list having a known meaning. An analogy phrase is received (1304) and at least one verb within the analogy phrase is identified (1306). A verb definition list is generated for the identified verb (1308) and a subject within the analogy phrase is identified (1310). A subject definition list is then generated for the identified subject (1312). The subject list has a relative term of the subject which can be either a hypernym or a hyponym. An adjective within the analogy phrase is identified (1314). An adjective definition list is subsequently generated for the identified adjective (1316) by filtering adjectives to accept adjective definitions associated with the identified subject and discarding non-associated definitions. A set of outcomes are identified (1318), with each outcome set including a verb definition, a subject definition, and an adjective definition. A corpus is searched for evidentiary use of each outcome in the identified set of outcomes (1320). The outcomes are ranked according to the level of detected evidentiary use in the corpus (1322), and the outcome with the highest ranking is outputted (1324).

It will be appreciated that there is disclosed herein a system, method, apparatus, and computer program product for evaluating natural language input, detecting an analogical pattern at an information handling system, and matching the detected pattern to a definition. As disclosed, the system, method, apparatus, and computer program product apply natural language processing to an information source to identify an analogical pattern in the input, with the identification including a subject term, a first verb phrase, a comparator term, a second verb phrase, and an object term. For example, the first analogical pattern may include a first analogic (which includes a subject noun term and a first verb), an adjective/idiom comparator term, and a second analogic (which includes a second verb and a noun object term).

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a machine learning model based on pattern dissection of analogies and their meanings to determine outcomes, including an extended characteristic of key items in the analogical patterns.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments of the invention have been described herein for purposes of illustration, various modifications may be made without departing from the spirit and scope of the invention. In particular, the natural language processing may be carried out by different computing platforms or across multiple devices. Furthermore, the data storage and/or corpus may be localized, remote, or spread across multiple systems. Accordingly, the scope of protection of this invention is limited only by the following claims and their equivalents.

What is claimed is:

1. A computer system comprising:
   a processing unit operatively coupled to memory;
   an artificial intelligence platform, in communication with the processing unit;
   a tool in communication with the processing unit to decipher a phrase upon activation by the artificial intelligence platform, including:
      obtaining an analogy list, each analogy within the analogy list having a known meaning;
      receiving an analogy phrase;
      parsing the analogy phrase to identify a term and a structure in the phrase;
      generating a definition list for the identified term and structure;
      identifying a set of outcomes, each outcome in the outcome set incorporating each identified term and structure and the generated definition list;
      for each outcome in the identified outcome set, searching a corpus for evidentiary use;
      ranking entries in the outcome set in accordance to an amount of evidentiary use found in the corpus;
      outputting at least one outcome from the outcome set with the highest ranking; and
      deriving an intended idiomatic meaning of the received analogy phrase from the outputted outcome.

2. The computer system of claim 1, wherein ranking entries in the outcome set includes applying a high rank for a high amount of evidentiary use found in the corpus.

3. The computer system of claim 1, wherein ranking entries in the outcome set includes applying a low rank for a low amount of evidentiary use found in the corpus.

4. A computer program product for deciphering a phrase, the computer program product comprising a computer readable storage device having program code embodied therewith, the program code executable by a processing unit to:
   obtain an analogy list, each analogy within the analogy list having a known meaning;
   receive an analogy phrase;
   parse the analogy phrase to identify a term and a structure in the phrase;
   generate a definition list for the identified term and structure;
   identify a set of outcomes, each outcome in the outcome set incorporating each identified term and structure and the generated definition list;

for each outcome in the identified set, search a corpus for evidentiary use;

rank entries in the outcome set in accordance to an amount of evidentiary use found in the corpus;

output at least one outcome from the outcome set with the highest ranking; and derive an intended idiomatic meaning of the received analogy phrase from the outputted outcome.

5. The computer program product of claim 4, wherein ranking entries in the outcome set includes applying a high rank for a high amount of evidentiary use found in the corpus.

6. The computer program product of claim 4, wherein ranking entries in the outcome set includes applying a low rank for a low amount of evidentiary use found in the corpus.

7. A method for utilizing an information handling system comprising a processor and memory to decipher a phrase, the method comprising:

obtaining an analogy list, each analogy within the analogy list having a known meaning;

receiving an analogy phrase;

parsing the analogy phrase to identify a term and a structure in the phrase;

generating a definition list for the identified term and structure;

identifying a set of outcomes, each outcome in the outcome set incorporating each identified term and structure and the generated definition list;

for each outcome in the identified outcome set, searching a corpus for evidentiary use;

ranking entries in the outcome set in accordance to an amount of evidentiary use found in the corpus;

outputting at least one outcome from the outcome set with the highest ranking; and deriving an intended idiomatic meaning of the received analogy phrase from the outputted outcome.

8. The method of claim 7, wherein ranking entries in the outcome set includes applying a high rank for a high amount of evidentiary use found in the corpus.

9. The method of claim 7, wherein ranking entries in the outcome set includes applying a low rank for a low amount of evidentiary use found in the corpus.

* * * * *